(12) United States Patent
Nimberger

(10) Patent No.: US 6,237,633 B1
(45) Date of Patent: May 29, 2001

(54) LOW EMISSION DISCONNECT SYSTEM

(75) Inventor: Spencer M. Nimberger, Houston, TX (US)

(73) Assignee: PGI International, Ltd., Houston, TX (US)

( * ) Notice: Subject to any disclaimer, the term of this patent is extended or adjusted under 35 U.S.C. 154(b) by 0 days.

(21) Appl. No.: 09/640,593

(22) Filed: Aug. 17, 2000

Related U.S. Application Data

(63) Continuation-in-part of application No. 09/531,634, filed on Mar. 21, 2000, now Pat. No. 6,155,295.

(51) Int. Cl.[7] .................................................. F16K 31/122
(52) U.S. Cl. ...................... 137/614.2; 137/614; 137/535; 137/543.21; 251/148
(58) Field of Search .............................. 137/614.2, 614, 137/535, 543.21, 543.17, 538, 614.01, 540, 528; 251/315.01, 148

(56) References Cited

U.S. PATENT DOCUMENTS

| | | | | |
|---|---|---|---|---|
| 4,023,773 | * | 5/1977 | Wise ...................................... | 251/148 |
| 4,124,036 | * | 11/1978 | Rogers .............................. | 251/148 X |
| 5,215,121 | * | 6/1993 | Michl ................................. | 137/614.2 |
| 5,546,976 | * | 8/1996 | Farguhar ........................ | 137/614.2 X |
| 5,855,225 | * | 1/1999 | Williams, III ........................ | 137/535 |
| 6,056,012 | * | 5/2000 | Yuen et al. ......................... | 137/614.2 |
| 6,155,295 | * | 12/2000 | Nimberger ............................ | 137/614 |

\* cited by examiner

*Primary Examiner*—Kevin Lee
(74) *Attorney, Agent, or Firm*—Browning Bushman

(57) ABSTRACT

A low emission fluid disconnect is provided along a flexible flow line for transmitting fluid from the transport to a bulkhead. The disconnect includes a ball valve including a ball rotated between the opened and the closed positions about a stem axis. The disconnect also includes union housing and a female body for threaded engagement with the ball valve. A poppet sleeve is linearly moveable within the union housing between the opened and closed positions, and has an end surface substantially conforming to an exterior surface of the ball. The poppet member is guided when moving between the opened and closed positions. A very low volume of fluid is released when the union housing is disconnected from the ball valve.

20 Claims, 10 Drawing Sheets

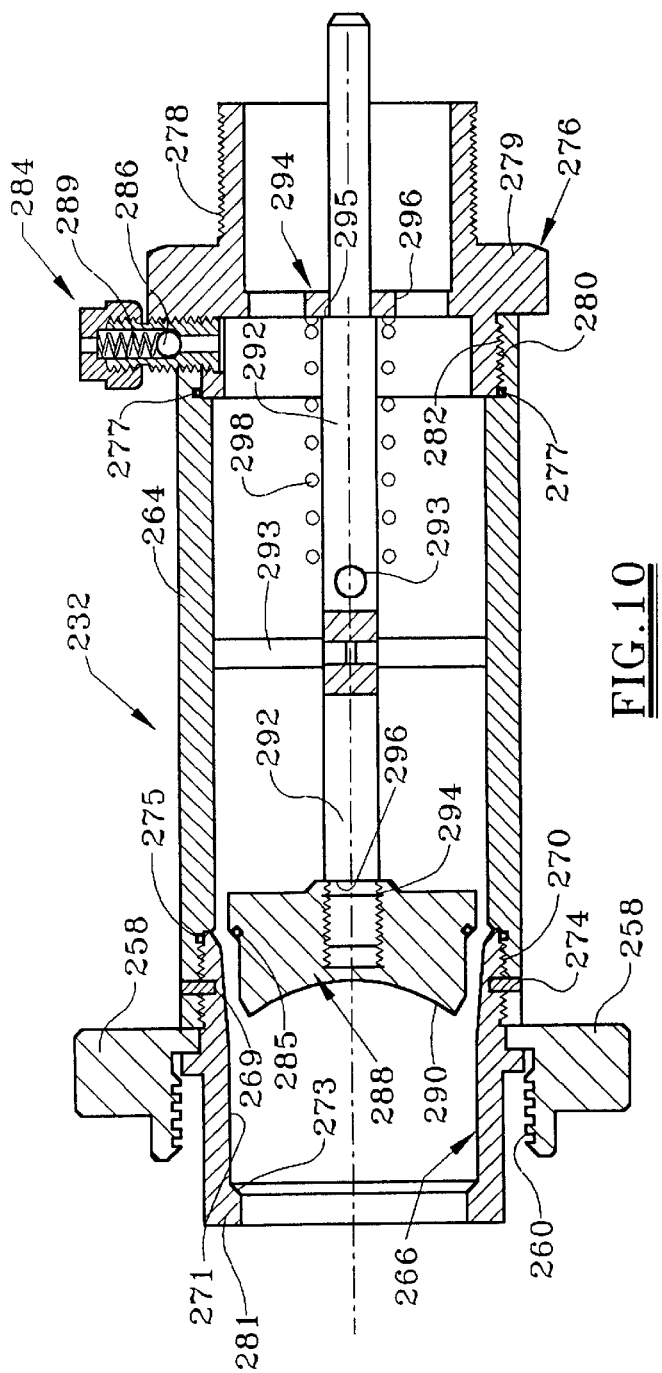
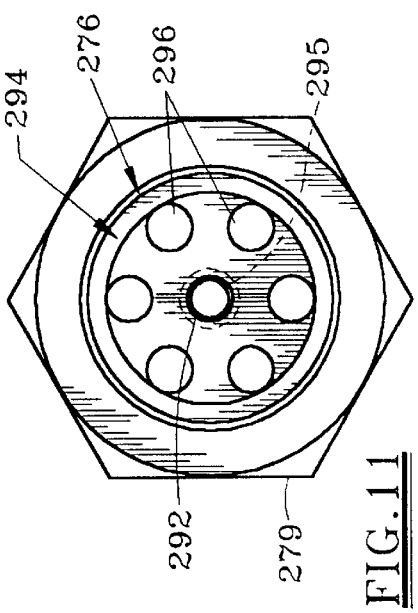
FIG. 10
FIG. 11

LOW EMISSION DISCONNECT SYSTEM

REFERENCE TO RELATED APPLICATION

This application is a continuation in part of U.S. application Ser. No. 09/531,634 filed Mar. 21, 2000 now U.S. Pat. No. 6,155,295.

FIELD OF THE INVENTION

The present invention relates to a fluid disconnect system of the type commonly used in flow lines. More particularly, this invention relates to a fluid disconnect system which may be used along a flexible flow line which connects a fluid transport vehicle with a stationary bulkhead. The disconnect system of the present invention offers very low emission of fluid during a disconnect operation, thereby saving fluid and reducing environmental contamination. The disconnect system of the present invention also provides a simplified disconnect which both reduces manufacturing costs and facilitates assembly and disassembly of the disconnect.

BACKGROUND OF THE INVENTION

Fluid disconnects in flow lines are used in various applications, including flow lines which interconnect an anhydrous ammonia bulkhead with a portable transport. The primary purpose of the disconnect is the ease of separation along this flow line, along with the ease of reconnecting the flow line to another portable transport.

While various types of disconnects are commercially available, many of these disconnects allow for a significant loss of fluid during disconnect separation. Each time the disconnect is separated, a sizeable amount of fluid escapes before the disconnect valves seal, and this escaping fluid, in addition to the fluid which is normally spaced between the closed valves of the disconnect, escapes to the atmosphere. This loss of fluid commonly is at least several hundred CCs of liquid, and the lost fluid either contaminates the soil surrounding the bulkhead station or vaporizes to contaminate the atmosphere. Other fluid disconnect systems cannot operate reliably at high fluid flow rates and/or high pressure, thereby limiting the use of the disconnect in systems where the time required to transmit fluid through the flexible flow line is at a premium.

The disadvantages of the prior art are overcome by the present invention. An improved flow emission disconnect system is hereinafter disclosed which is particularly suitable for use in a flexible flow line extending from a transport to a bulkhead. The fluid disconnect system is rated at a high flow rate and a high pressure, and most importantly the disconnect system results in a very slight loss of fluid as a result of the disconnect operation.

SUMMARY OF THE INVENTION

A low emission disconnect is provided for positioning along a fluid flow line, e.g., along a flexible flow line interconnecting an anhydrous ammonia bulkhead with a portable transport. The disconnect includes a valve body with a ball mounted therein and rotatable about a stem axis, a union housing, and a female body for threaded engagement with the valve body to bring the union housing into seal engagement with the valve body. A poppet member within the union housing is linearly moveable from an opened position to a closed position, and has a upstream end surface substantially conforming to an exterior surface of the ball when the ball is closed. An upstream end of the poppet member has an exterior cylindrical surface for guided engagement with the interior cylindrical surface on the union housing, and one or more guide member provide for guiding movement of the poppet member with respect to the union housing between the opened and the closed position. A coil spring biases the poppet member in the closed position.

Certain features of the invention as set forth above are disclosed in U.S. application Ser. No. 09/531,634 filed Mar. 21, 2000. The present invention is directed primarily to a disconnect that is easy to assemble and disassemble while providing a simplified disconnect with a reduced manufacturing cost. The poppet member has an axially extending stem and a spring about the stem urges the poppet member closed. Further, a hydrostat for the union housing includes a check valve and is mounted on the union housing which receives the poppet member to relieve any excess fluid pressure within the union housing.

An annular seal on the poppet member may be easily replaced. The ease of disassembly of the disconnect facilitates the replacement of the annular seal. A rear end fitting for the union housing may be threaded onto the housing and a hydrostat effective when mounted on the housing to releasably connect the union housing and end fitting in a releasably locked position. The disconnect of the present invention may be reliably used by relatively inexperienced personnel.

It is an object of the invention to provide a low emission disconnect which may be reliably used along a flexible flow line, wherein the disconnect components, when disconnected, result in a very low loss of the fluid being ransported through the disconnect. A related object of the invention is to provide a disconnect which does not substantially restrict the flow of fluid along the flow line when the disconnect is in the opened position.

An additional object of the present invention is to provide a low emission disconnect including a poppet valve member having a stem extending axially therefrom and a spring about the stem for urging the poppet member closed. The utilization of an axial stem facilitates the assembly and disassembly of the disconnect and reduces manufacturing costs.

It is a feature of the invention that the disconnect include a poppet member which is linearly moveable along a relatively long stroke length between the opened and the closed positions, thereby resulting in a relatively low pressure drop across the disconnect when a high volume of fluid is transmitted through the disconnect.

A further feature of the invention is to provide mechanism to relieve the fluid pressure within the union housing utilizing a hydrostat enclosing a check valve, with the hydrostat also serving to releasably lock a rear end fitting to the union housing.

A significant advantage of the low emission disconnect is that the disconnect may be reliably used by relatively inexperienced personnel.

These and further objects, features, and advantages of the present invention will become apparent from the following detailed description, wherein reference is made to the figures in the accompanied drawings.

BRIEF DESCRIPTION OF THE DRAWINGS

FIG. 10 is a sectional view similar to FIG. 9 but showing the poppet ember and spring in an opened position.

FIG. 11 is a rear end elevation view of the union housing of FIG. 9 showing a rear end piece and a mounting plate therein for guiding the axial stem and supporting the spring for the poppet member.

DETAILED DESCRIPTION OF PREFERRED EMBODIMENTS

Figure 1:
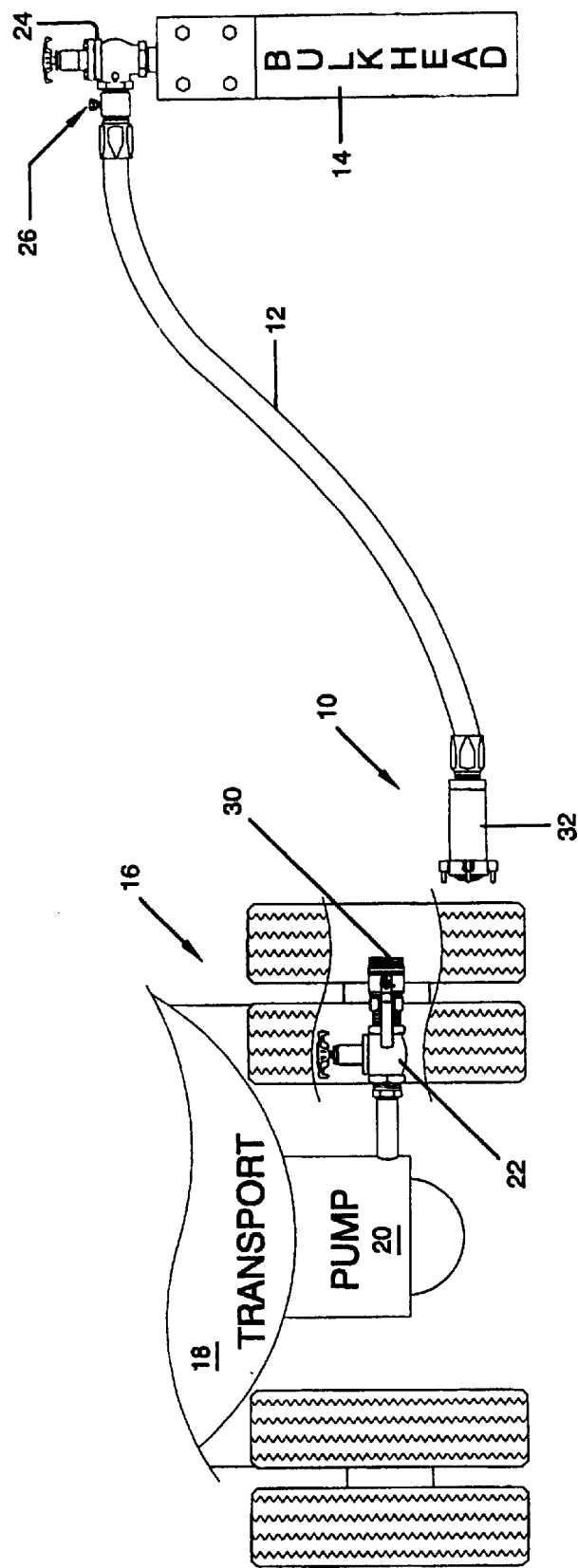
FIG. 1 is a simplified pictorial view of a low emissions disconnect according to the present invention positioned along a flexible flow line interconnecting a bulkhead with a transport.

FIG. 1 illustrates a suitable application for a low emission disconnect 10 according to the present invention, with the disconnect in FIG. 1 shown in a separated condition. Fluid disconnect 10 is provided along a flexible flow line 12 which, as shown in FIG. 1, transmits the flow of fluid from a portable transport 16 to bulkhead 14. The flow line 12 and components along the flow line may be reversed for transmitting fluid from the bulkhead 14 to the transport 16. In the application as shown in FIG. 1, fluid is normally conveyed from a transport to the bulkhead, and thus the transport 16 includes a storage tank 18 and a pump 20 for pumping fluid along the flexible flow line 12 to the bulkhead. A control valve 22 is commonly provided immediately upstream from the disconnect 10. The bulkhead 14 includes another conventional valve 24 and a hydrostat 26. When disconnected, FIG. 1 illustrates that the flexible hose 14 stays with the bulkhead. The disconnect 10 includes a selectively actuatable valve member 30 and a union member 32, which are shown in greater detail in FIG. 2.

Figure 2:
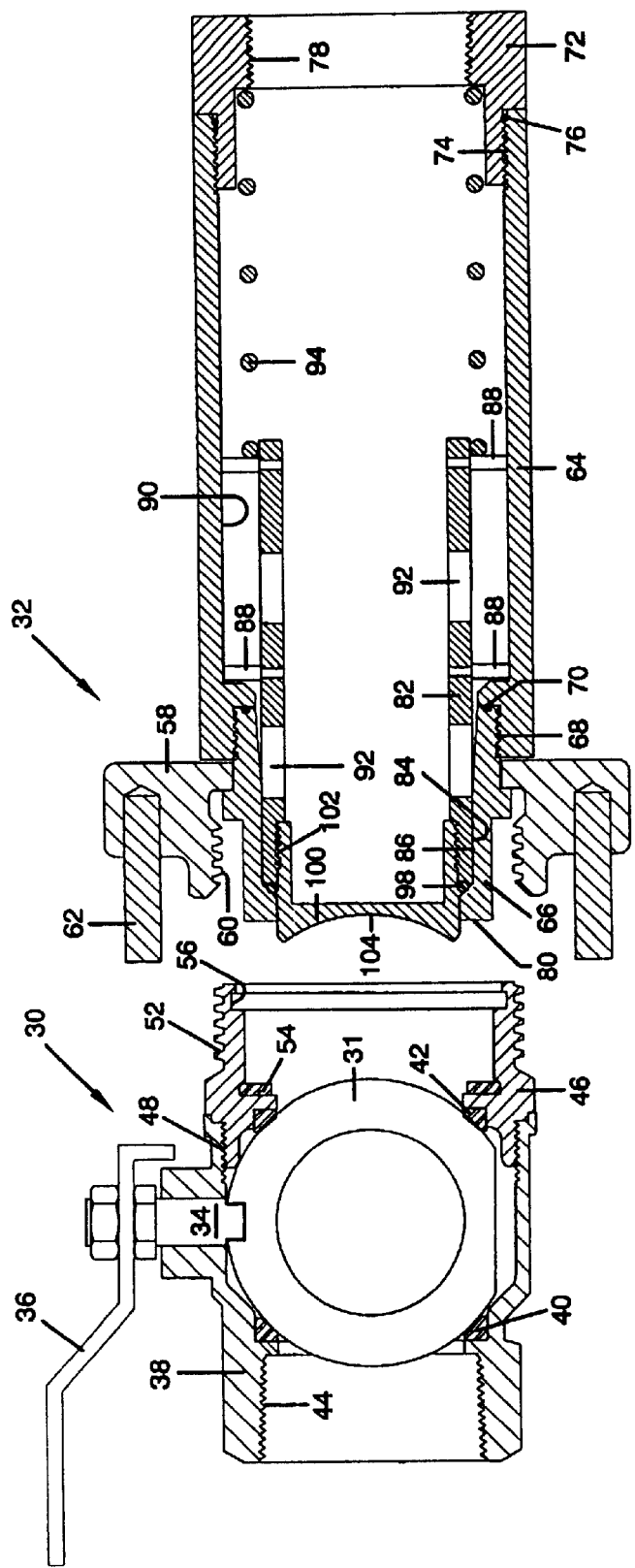
FIG. 2 is a cross-sectional view of the disconnect shown in FIG. 1 in the disconnected position.

As shown in FIG. 2, the valve member 30 includes a conventional ball 31 which is rotatable from an opened position to a closed position by rotation of a stem 34. The stem 34 may be rotated by a conventional valve handle 36. Alternatively, a powered valve actuator may be used to rotate the stem 34 and thus the ball 31. The ball 31 is shown in FIG. 2 in the closed position within the valve body 38, with an upstream seal 40 and a downstream seal 42 providing sealing engagement with the ball. The threads 44 may thus be connected to a hose or a short section of pipe, which in turn is connected to the valve 22 shown in FIG. 1. The tail piece 46 is threadably connected to the valve body 38 by threads 48, and includes external threads 52 and a seal 54 designed for engagement with the union member 32 as discussed below. Another annular groove 56 is provided within the tail piece 46, and is also discussed below.

The union member 32 includes a female hammer component 58 with an internal thread 60 for mating engagement with the external threads 52. A plurality of pins or protector members 62 may be circumferentially spaced about the hammer component 58. These protector members prevent the inadvertent release of pressurized fluid from the disconnected union member 32 in the event that the union member is dropped. Without the protector members 32, the end cap 100 discussed subsequently otherwise may engage a foreign object which would move the end cap within the housing 64. Various types of protection devices may be provided for serving this purpose, and the pins 32 are merely one mechanism for achieving this objective.

The hammer component 58 is conventionally rotated to apply a sufficient torque to the component 58 to reliably mate the disconnect. The female hammer component on female body 58 thus rotates about the elongate body 64. An upstream component 66 is threaded at 68 to the elongate union housing 64, with a stationary seal 70 providing static sealing engagement. A downstream component 72 is threaded at 74 to the opposing end of the elongate body 64, and a similar static o-ring 76 is shown. Internal threads 78 are provided on the downstream component 72 for engagement with a conventional threaded member (not shown in FIG. 2) provided on the end of the flexible hose 12. Alternatively, a rigid pipe may be threaded directly to the threads 78.

Referring now to FIGS. 1 and 2, the planar end face 80 of the upstream component 66 presses against the seal 54 when the hammer union 58 is threadably connected to the valve member 30, thereby providing a fluid-tight seal between the tail piece 46 of the valve member 30 and the upstream component 66 of the union member 32. A sleeve-shaped poppet member 82 has an external diameter cylindrical surface 83 which provides a relatively tight sliding fit with the internal diameter cylindrical surface 86 of the upstream component 66. A plurality of axially spaced guide pins 88 are each press fitted within a receiving aperture in the poppet sleeve 82. The guide pins 88 are sized such that the end surface of these pins slide along the internal surface 90 of the elongate housing 64, as explained subsequently. The interior cylindrical surface 86 has a diameter less than the diameter of the cylindrical surface of the downstream portion of the union housing 32 engaged by the pins 88. The plurality of flow apertures 92 are also circumferentially and axially spaced about the poppet sleeve 82, and fluid flows through these ports 92 when transmitting fluid through the disconnect 10. A conventional coil spring 94 is provided for biasing the poppet sleeve 82 toward the upstream member 66, thereby compressing the seal 98 which seals between the upstream component 66 and the poppet sleeve 82. An end cap 100 is threadably connected at 102 to the poppet sleeve 82, and includes an end surface 104 which forms a portion of a sphere. Most importantly, the contour of the surface 104 at least substantially confirms to the contour of the exterior surface of the ball 31, as shown in FIG. 2, so that very little volume is provided between the closed ball 31 and the end cap 100. The end surface 104 has a diameter substantially conforming to the diameter of seal 54. More particularly, the volume between the seal 42 which seals with the ball 31 and the seal 98 which seals with the upstream component 66 is less than 8 CCs for a disconnect sized for accommodating a 2 inch flexible low line, and preferably is about 5 CCs or less.

Figure 3:
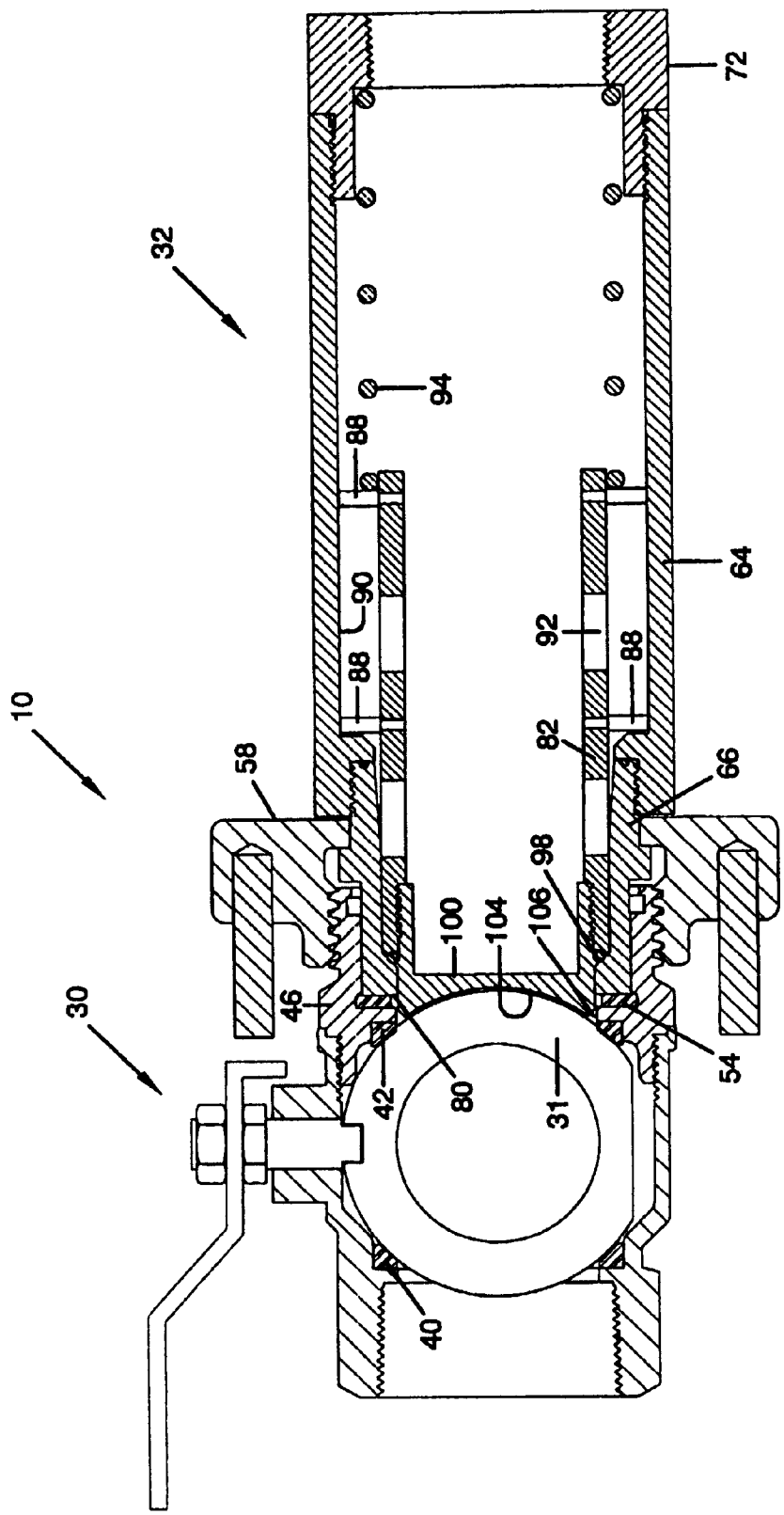
FIG. 3 is a cross-sectional view of the disconnect shown in FIG. 2 in the connected position.

The end surface 80 in the upstream component 66 is pressed against the seal 54 by the force resulting from the torqued engagement of the hammer union 58 with the threads 52. When the ball valve 32 is closed as shown in FIG. 3, the spring 94 thus biases the poppet sleeve 86 toward the ball, thereby compressing the seal 98 which seals between the upstream 66 and the poppet sleeve 82. When the ball 31 is closed and the hammer component 58 is loosened for manually disconnecting the ball member 30 from the union member 32, a very small volume 106 exists between the seals 42 and 98, and thus a very low volume of fluid will escape during the disconnect operation.

Figure 4:
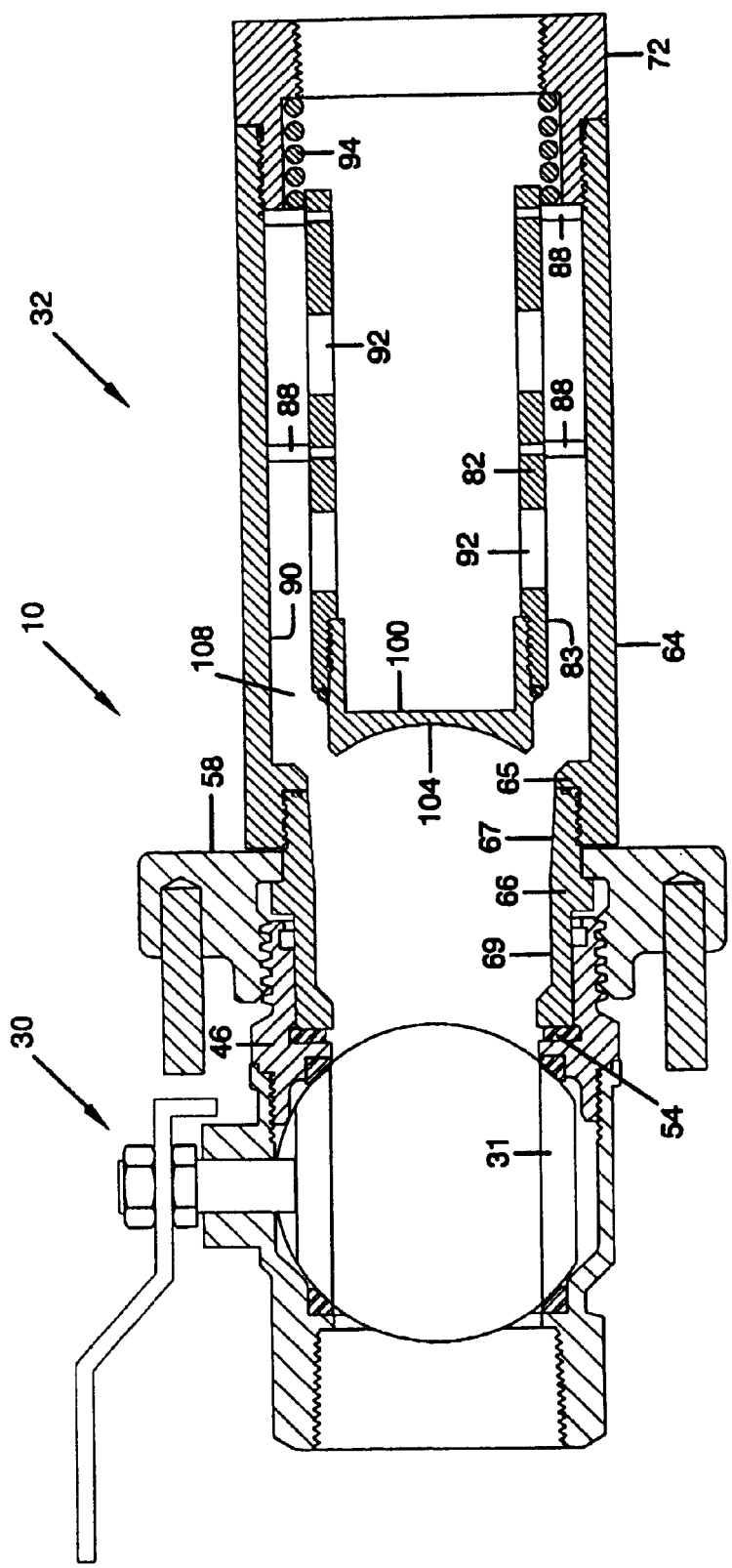
FIG. 4 is a cross-sectional view of the disconnect shown in FIG. 2 with fluid flowing through the disconnect.

FIG. 4 shows the assembled disconnect 10 with fluid flowing through the open ball member 32 and past the poppet sleeve 82. The force of the fluid flowing through the ball 31 thus presses against the end cap 100, thereby moving the poppet sleeve 82 away from the ball 31 and compressing the spring 94. As the poppet sleeve moves within the elongate housing 64, the sleeve 82 is guided initially by engagement of the surfaces 84 and 86, and both initially and subsequently by engagement of the guide pins 88 with the interior surface 90. Fluid flowing past the ball thus passes radially outward of the end cap 104 and into the annular spacing 108 between the housing 64 and the poppet sleeve 82. Fluid then flows radially inward through the ports 92 and the poppet sleeve, then continues to flow downstream through the downstream component or hose connect member 72.

It is a particular feature of the invention that the union member 32 is provided so that the poppet sleeve 82 moves a substantial axial distance from the closed to the opened position in response to fluid flow. Because of the relatively long movement or "stroke" of the poppet sleeve 82, it is important that the poppet sleeve be guided with respect to the elongate housing 64 during this movement, thereby ensuring that the poppet sleeve will reliably move back to the closed position as shown in FIG. 3 in response to the spring 94 when the ball valve 32 is closed. This guiding function is primarily achieved by the guide pins 88. The guide members 88 are spaced linearly opposite the end surface 104 with respect to the cylindrical surface 84. This guiding function is also obtained by providing a relatively close tolerance between the outer surface 84 of the poppet sleeve 82 and the inner surface 86 of the upstream component 66. This close tolerance thus also ensures that the seal 98 will form a reliably fluid-tight barrier between the poppet sleeve 82 and the upstream component 66.

Figure 5:
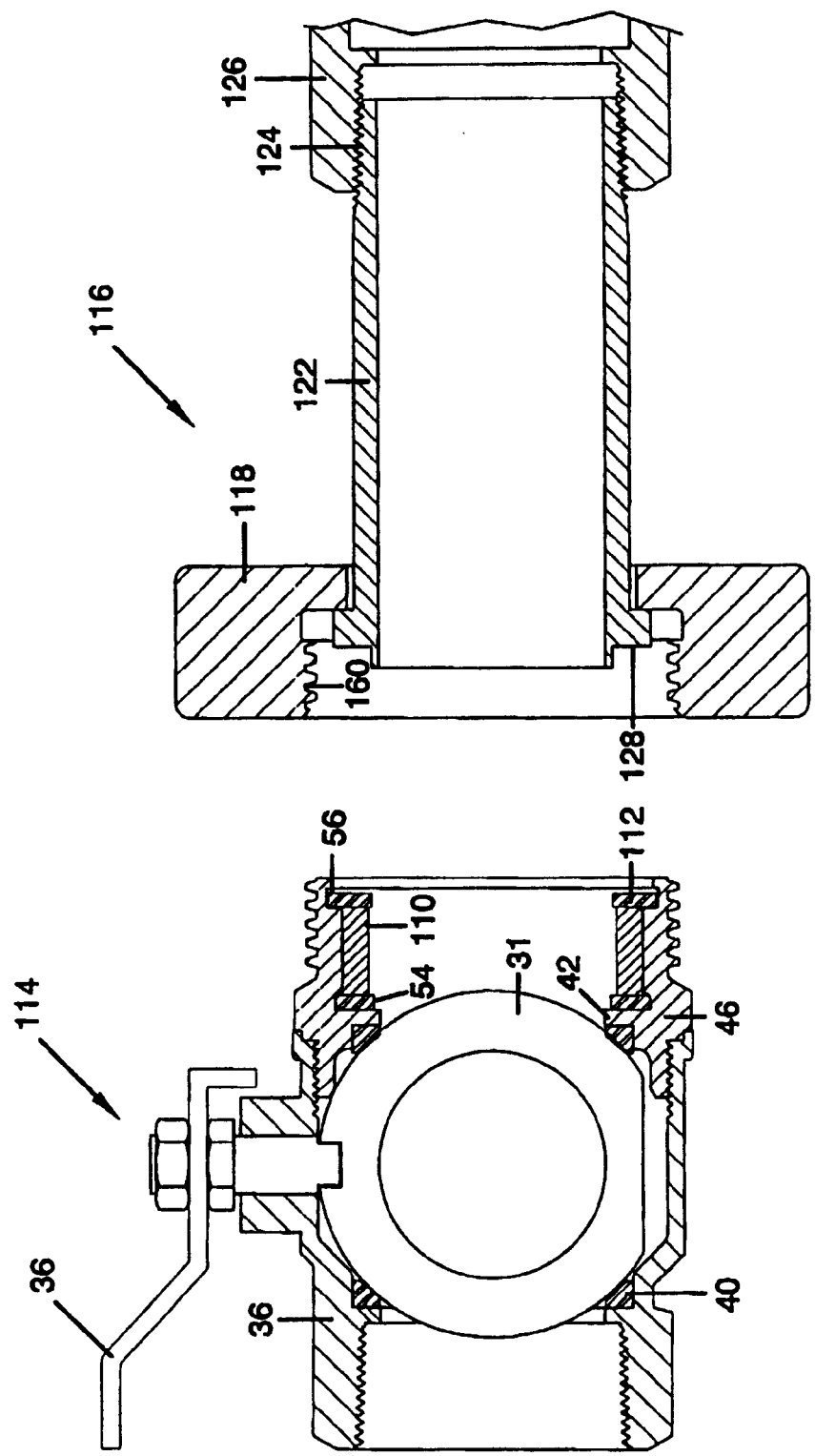
FIG. 5 illustrates the ball valve shown in FIGS. 2–4 adapted for mating engagement with a conventional union housing and female body.
Figure 6:
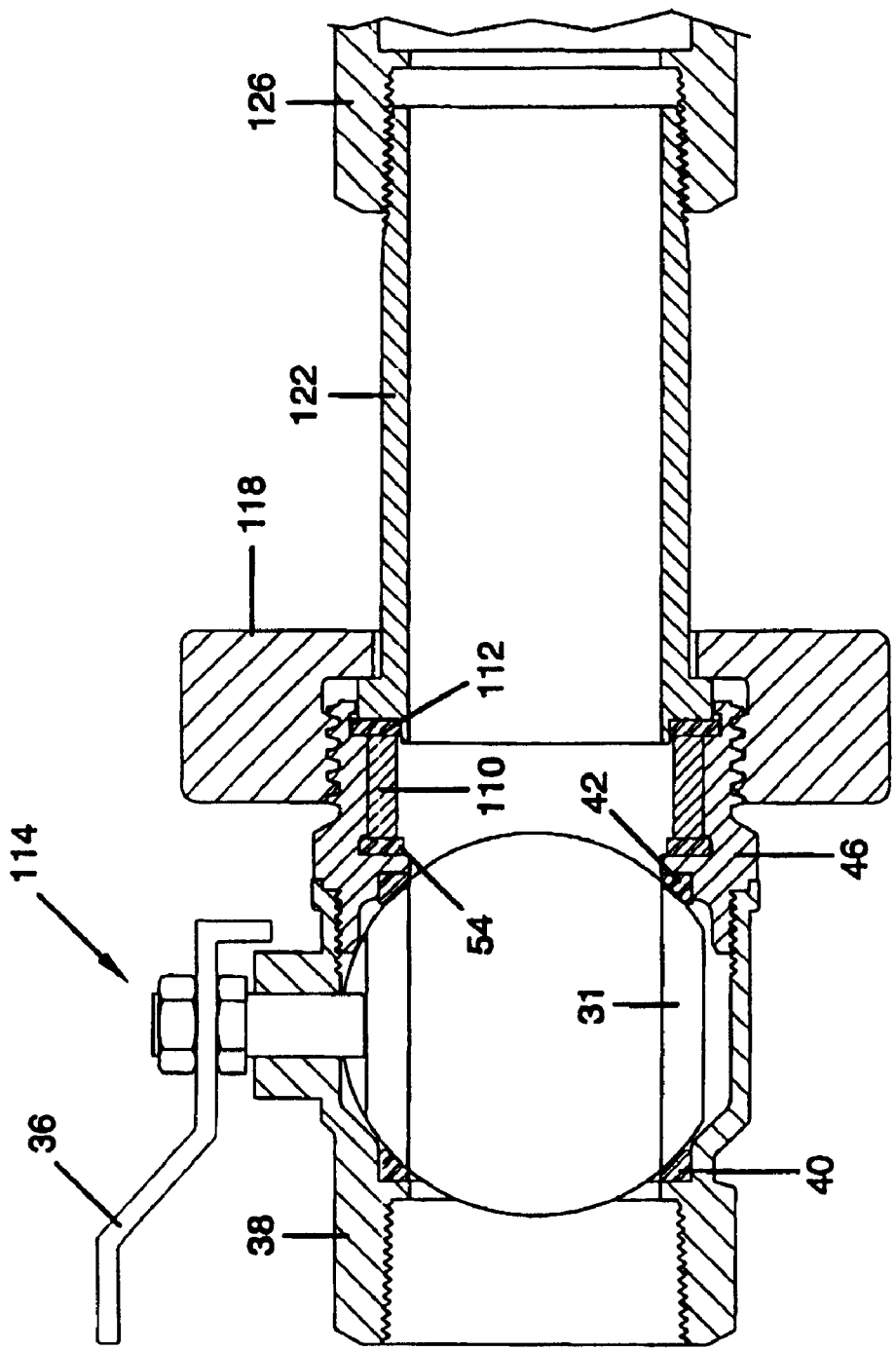
FIG. 6 illustrates the components shown in FIG. 5 in the connected position.

It is a feature of the present invention that the poppet sleeve 82 has a relatively long stroke, as discussed above. More particularly, the axial travel or stroke of the poppet sleeve 82 is greater than the nominal diameter of the flow path or flow passageway in the ball 31, and preferably is at least 25% greater than the diameter of the flow path in the ball 31. This long stroke is required since, as explained subsequently, it is also a feature of the invention that the valve member 30 be designed to be easily revised to accommodate a conventional union, as shown in FIGS. 5 and 6. In order to provide a disconnect which does not unduly restrict the flow of fluid through the disconnect when the valve 32 is opened, while also providing a reliable disconnect which minimizes the loss of fluid once the disconnect is manually separated, the poppet sleeve 82 has a substantial stroke between the opened and the closed position, as shown in FIGS. 3 and 4.

A related feature of the disconnect 10 is the slow "bleed-out" or return of the poppet sleeve 82 and the end cap 100 to the closed position as shown in FIG. 3 once the ball valve 32 is closed. With the ball 31 closed, fluid immediately downstream from the ball 31 becomes substantially trapped once the outer diameter surface 84 of the poppet sleeve 82 passes to the left past the internal stop 65 on the housing 64. As the poppet sleeve 82 continues to the left in response to the force of the spring 94, this annular gap or spacing minimizes due to the tapered interior surface 67 on the upstream component 66. Once the poppet sleeve 82 passes within the cylindrical surface 69 of the upstream component 66, only the slight tolerance gap between the O.D. of surface 83 and the I.D. of surface 69 allows for the escape of fluid past the end cap 100. This slow bleed of fluid desirably reduces the impact forces on the components when the ball 31 is closed, thereby prolonging the life of the disconnect.

Referring again to FIG. 1, there may be instances where the operator desires to connect the valve member 30 of the disconnect 10 with a conventional union, rather than the low emission union 32 as discussed above. This connection may be easily and quickly accomplished by inserting a short sleeve-shaped steel conversion spacer 110 as shown in FIG. 5 into engagement with the seal 54. Another seal 112 is then positioned against the spacer 110, and within the annular cavity 56 discussed earlier. With this slight modification, the converted valve member 114 may be reliably used with a conventional union 116. The conventional 116 thus includes a rotatable union member 118 having internal threads 160 for mating with the threads 52, and a sleeve shaped housing 122 having downstream threads 124 for sealing with an end 126 of a flexible hose. Referring to FIGS. 5 and 6, a planar end surface 128 is brought into engagement with the seal 112 when the union member 118 is threaded to the modified valve assembly 114, thereby providing a fluid-tight seal between the tail piece 46 and the union housing 122.

The assembly as shown in FIGS. 2–5 may thus be easily converted for receiving a standard union 116, and may then be easily returned for interconnection with the preferred union 32 shown in FIG. 2. FIGS. 5 and 6 also illustrate the disadvantages of a conventional disconnect. When the union 116 is separated from the valve assembly 114, a volume of fluid in the flexible hose 12 as shown in FIG. 1 between the valve 28 and the standard union 116 may be vented to atmosphere. A conventional flexible hose is approximately 12 foot long, and a standard 2 inch hose of that length houses approximately 2 gallons of fluid. Accordingly, a substantial volume of fluid may be easily lost when using a conventional disconnect. In some prior art disconnect systems, a check valve is provided at the transport end of the flexible hose 12 for minimizing the loss of fluid when the disconnect is separated. With this conventional check valve, approximately 400 CCs of liquid normally exists between the ball valve and the check valve, and thus 400 CCs are vented to atmosphere when each disconnect is broken. With the preferred low emission disconnect system of the present invention, a very low fluid volume is provided between the closed valve members 32 and 82 as shown in FIG. 3, and thus only approximately 5 CCs of liquid is lost during each disconnect. Moreover, the disconnect of the present invention is rated such that a two inch flow line may reliably transmit up to 350 gpm of fluid, so that the improved disconnect of the present invention does not cause a significant increase in the time required to pass fluids from the transport to the bulkhead.

The disconnect has been particularly described for an application wherein a disconnect is used in a flexible flow line which interconnects a portable transport to the bulkhead. As previously explained, the disconnect may also be used in a flow line which interconnects the bulkhead to a portable transport. More importantly, however, it should be understood that this application for the disconnect is exemplary, and the low emissions disconnect in the present invention may be used in a variety of applications in a variety of flow lines, and is particularly well suited for applications wherein it is desirable to substantially minimize the loss of fluid and the resulting contamination during each disconnect operation.

Figure 7:
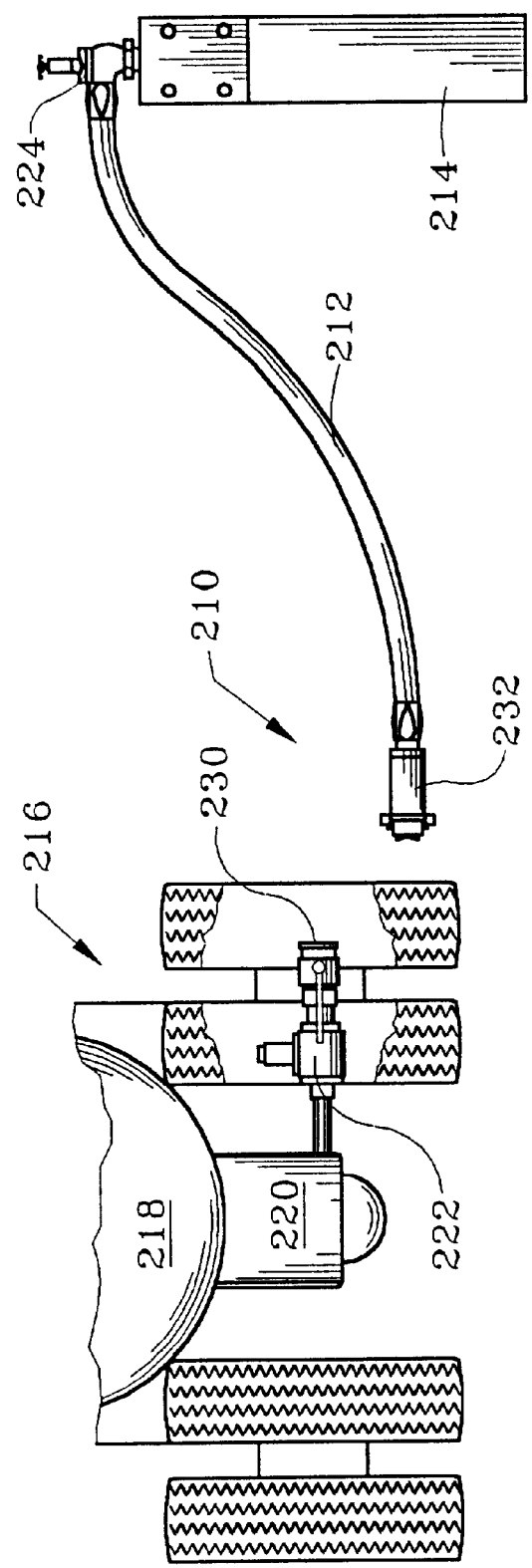
FIG. 7 is a simplified pictorial view of another embodiment of a low emission disconnect according to the present invention positioned along a flexible flow line interconnecting a bulkhead with a transport.

Another embodiment of the invention is illustrated in FIGS. 7–11. Figure illustrates a suitable application for a low emission disconnect 210 according to the present invention, with the disconnect in FIG. 7 shown in a separated condition. Fluid disconnect 210 is provided along a flexible flow line 212 which, as shown in FIG. 7, transmits the flow of fluid from a portable transport 216 to bulkhead 214. The flow line 212 and components along the flow line may be reversed for transmitting fluid from the bulkhead 214 to the transport 216. In the application as shown in FIG. 7, fluid is normally conveyed from a transport to the bulkhead, and thus the transport 216 includes a storage tank 218 and a pump 220 for pumping fluid along the flexible flow line 212 to the bulkhead. A control valve 222 is commonly provided immediately upstream from the disconnect 210. The bulkhead 214 includes another conventional valve 224. When disconnected, FIG. 7 illustrates that the flexible hose 214 stays with the bulkhead. The disconnect 210 includes a selectively actuatable valve member 230 and a union member 232, which are shown in greater detail in FIG. 8.

Figure 8:
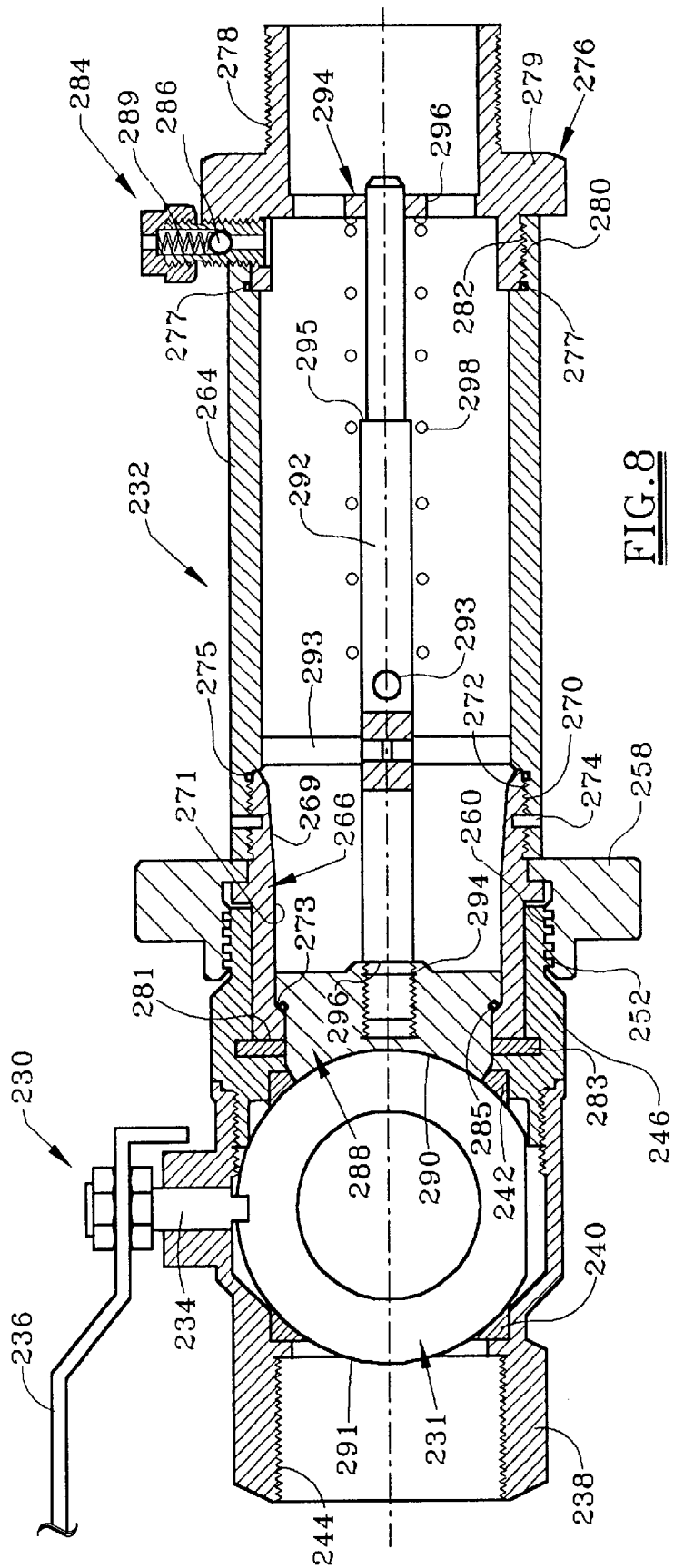
FIG. 8 is a cross-sectional view of the disconnect embodiment shown in FIG. 7 with the ball valve member in a closed position.

As shown in FIG. 8, the valve member 230 includes a conventional ball or ball member 231 which is rotatable from an opened position to a closed position by rotation of a stem 234. The stem 234 may be rotated by a conventional valve handle 236. Alternatively, a powered valve actuator may be used to rotate the stem 234 and thus the ball 231. The ball member 231 is shown in FIG. 8 in the closed position within the valve body 238, with an upstream seal 240 and a downstream seal 242 providing sealing engagement with the ball. The threads 244 may thus be connected to a hose or a short section of pipe, which in turn is connected to the valve 222 shown in FIG. 7. The downstream tail piece 246 includes external threads 252 designed for engagement with the union member 232 as discussed below. The union member 232 includes a female hammer component 258 with an internal thread 260 for mating engagement with the external threads 252.

Figure 9:
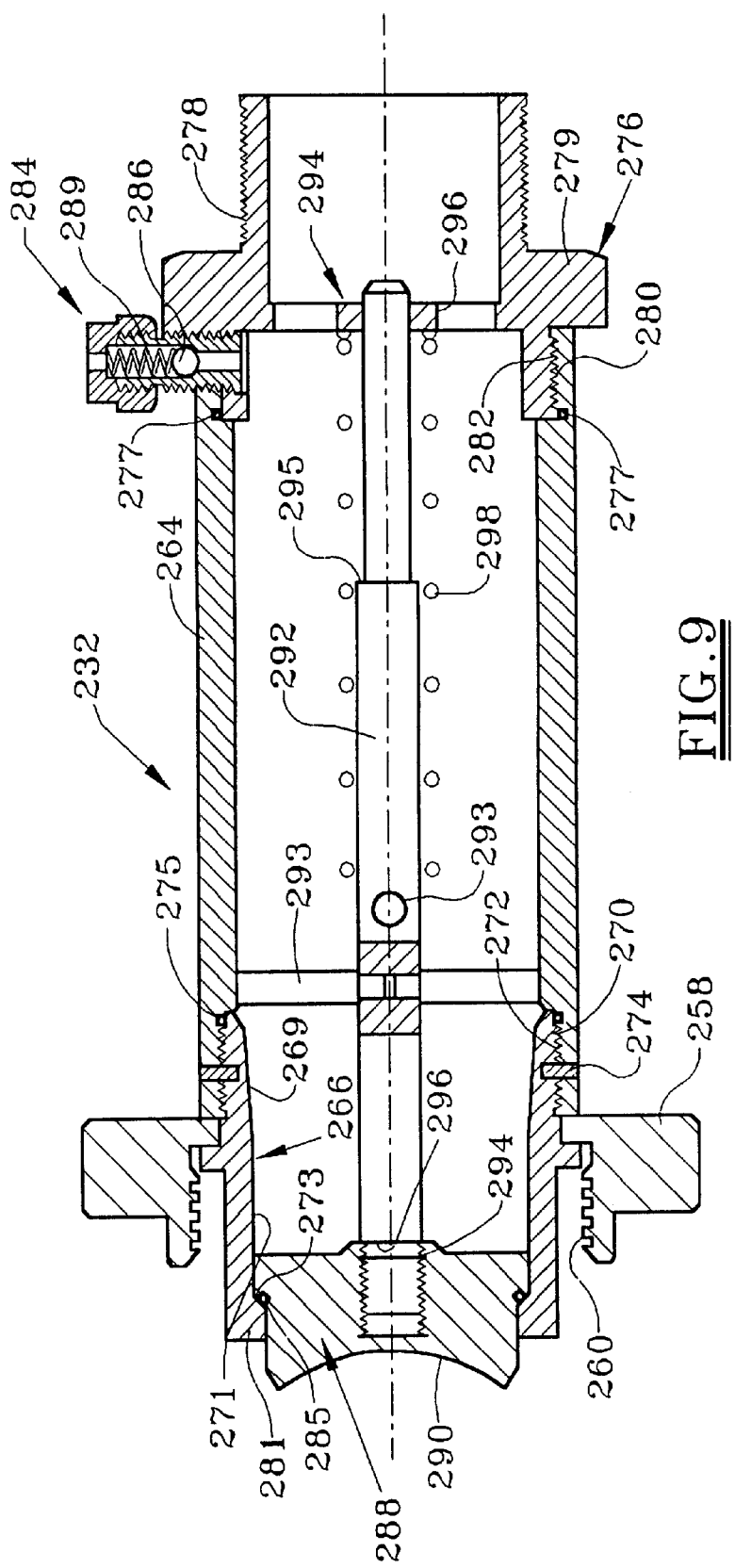
FIG. 9 is a cross-sectional view of the embodiment of FIGS. 7 and 8 showing the union housing removed from the ball valve member with the poppet ember shown in a closed position.

FIGS. 9 and 10 show union housing 232 removed from the valve member shown at 230. Union housing 232 has a cylindrical housing 264. A front end sleeve fitting shown at 266 is externally threaded at 270 and engages internal threads 272 in threaded relation on cylindrical housing 264. An O-ring 275 is provided between sleeve 266 and cylindrical housing 264. Permanent locking pins 274 connect cylindrical housing 264 to front end sleeve fitting 266. Front end sleeve fitting 266 includes a frustoconical or tapered inner surface 269, a cylindrical inner surface 271 and an inner shoulder 273.

A rear end fitting 276 has a hexagonal nut 279 and external threads 278 for connecting to a suitable hose or pipe for valve 224 and bulkhead 214. An O-ring seal 277 seals between fitting 276 and cylindrical housing 264. External male threads 280 engage female or internal threads 282 on cylindrical housing 264. A hydrostat shown generally at 284 has a check valve 286 therein urged to a closed position by spring 289. Hydrostat 284 is threaded within aligned openings of cylindrical housing 264 and end fitting 276 and is effective for releasably securing end fitting 276 to cylindrical housing 264.

Mounting within cylindrical housing 264 for reciprocal movement between opened and closed positions of ball member 231, a poppet member is shown at 288 having a spherical surface 290 which fits snugly against the spherical surface 291 of ball member 231. Thus, the contour of spherical surface 290 conforms to the contour of spherical surface 291 of ball member 231. An O-ring 285 fits against shoulder 287 on poppet member 288, and is crimped to shoulder 287.

Poppet member 288 has an axial stem or rod 292 extending therefrom. Stem 292 is threaded within poppet 288 and is crimped at 294 within a groove 296 of stem 292. Two pairs of opposed centering pins 293 are spaced along stem 292 and ride along the inner peripheral surface of cylindrical housing 264 to maintain stem 292 in a centered position. Rear end fitting 276 has a perforated plate shown at 294 with perforations or openings 296 therein. A central opening in the housing 264 receives stem 292 as shown in FIGS. 7–9. A conventional coiled spring shown at 298 is biased between perforated plate 294 a pair of opposed centering pins 293 for continuously urging O-ring 285 into sealing engagement with shoulder 273. An abutment 295 on stem 292 contacts plate 294 to limit the movement of stem 292. Poppet member 288 has a relatively long movement or "stroke" and centering pins 293 together with plate 294 are effective in guiding poppet member 288.

Referring now to FIG. 8, the planar end face 281 of the sleeve 266 presses against seal 283 when the hammer union 258 is threadably connected to the valve member 230, thereby providing a fluid-tight seal between the tail piece 246 of the valve member 230 and the upstream sleeve fitting 266 of the union member 232. Poppet member 288 has an O-ring seal 285 which seats against shoulder 273 of sleeve 266. Coil spring 298 biases the poppet member 288 toward sleeve 266 thereby compressing seal 285. Rotation of hammer 258 compresses seal 283 which seals between valve member 230 and union housing 232. The contour of the surface 290 conforms to the contour of the spherical exterior surface 291 of the ball 231, as shown in FIG. 8, so that very little volume is provided between the closed ball 231 and the poppet member 288. The volume between the seal 242 which seals with the ball 231 and the seal 285 which seals with the sleeve 266 is less than 8 CCs for a disconnect sized for accommodating a 2 inch flexible flow line, and preferably is about 5 CCs or less.

It is a feature of the invention that the union member 232 is provided so that the poppet member 288 and stem 292 move a substantial axial distance from the closed to the opened position of ball member 231 in response to fluid flow. Because of the relatively long movement or "stroke" of the poppet member 288, it is important that the poppet member 288 and stem 292 be guided so that the poppet member 288 will reliably move back to the closed position as shown in FIG. 8 in response to the spring 298 when the ball member 231 is closed. This guiding function is achieved by stem 292, centering pins 293, and plate 294.

It is a feature of the present invention that the poppet member 288 has a relatively long stroke, as discussed above. More particularly, the axial travel or stroke of the poppet member 288 is greater than the nominal diameter of the flow path or flow passageway in the ball 231, and preferably is at least 25% greater than the diameter of the flow path in the ball 231. In order to provide a disconnect which does not unduly restrict the flow of fluid through the disconnect when the valve member 230 is opened, while also providing a reliable disconnect which minimizes the loss of fluid once the disconnect is manually separated, the poppet member 288 has a substantial stroke between the opened and the closed position, as shown in FIGS. 8 and 10.

The embodiment of FIGS. 7–11 as compared against the embodiment of FIGS. 1–6 is directed primarily to a disconnect that is easy to assemble and disassemble while providing a simplified disconnect with a reduced manufacturing cost. The poppet member has an axially extending stem and a spring about the stem urges the poppet member closed. Further, a hydrostat for the union housing includes a check valve and is mounted on the union housing which receives the poppet member to relieve any excess fluid pressure within the union housing. The ease of disassembly of the disconnect facilitates the replacement of an annular seal on the poppet member. Also, a rear end fitting for the union housing may be threaded onto the housing and a hydrostat effective when mounted on the housing to releasably connect the union housing and end fitting in a releasably locked position.

The disconnects shown in FIGS. 1–6 and in FIGS. 7–11 have been particularly described for an application wherein a disconnect is used in a flexible flow line which interconnects a portable transport to the bulkhead. As previously explained, the disconnect may also be used in a flow line which interconnects the bulkhead to a portable transport. More importantly, however, it should be understood that this application for the disconnect is exemplary, and the low emissions disconnect in the present invention may be used in a variety of applications in a variety of flow lines, and is particularly well suited for applications wherein it is desirable to substantially minimize the loss of fluid and the resulting contamination during each disconnect operation.

What is claimed is:

1. A low emission disconnect for positioning along a fluid flow line, the disconnect comprising:
    a valve body having an external male thread portion;
    a ball mounted within the valve body and rotatable about a stem axis between an opened position and a closed position;
    a union housing for sealed engagement with the valve body;
    a female body having an internal female thread thereon for threaded engagement with the male thread on the valve body to bring the union housing into sealed engagement with the valve body;
    a poppet member linearly moveable within the union housing from an opened position to a closed position, the poppet member having an upstream end for positioning within the valve body and a linearly opposing downstream end, the upstream end having an end surface substantially conforming to an exterior surface of the ball when the ball is in the closed position;
    the upstream end of the poppet member having an exterior cylindrical surface for guided engagement with an interior cylindrical surface on the union housing when the poppet member moves to the closed position;
    a stem extending axially from the downstream end of the poppet member and axially away from the upstream end of the poppet member;
    one or more guide members for said central stem spaced axially from said poppet member along a length of said stem for guiding movement of the poppet member with respect to the union housing between the opened and the closed position; and
    a biasing member for biasing the poppet member to the closed position.

2. The low emission disconnect as defined in claim 1, further comprising:
    a seal on the upstream end of said poppet member for engaging in sealing relation an inner surface on the union housing in the closed position of the valve member.

3. The low emission disconnect as defined in claim 2, wherein said seal comprises an O-ring on the upstream end of said poppet member, and an inner sleeve member within said union housing forms the inner surface of the union housing for receiving the O-ring in sealing relation.

4. The low emission disconnect as defined in claim 3, wherein said inner sleeve member defines a frustoconical inner surface at the downstream end of said sleeve, a cylindrical inner surface adjacent said frustoconical surface, and an annular inner shoulder adjacent the upstream end of inner sleeve member; and
    said O-ring sealing against said shoulder in the closed position.

5. The low emission disconnect as defined in claim 1, wherein said union housing includes a cylindrical housing having a downstream tail piece threaded therein; and
    a hydrostat in fluid communication with said cylindrical housing and having a check valve member therein for relieving any excessive fluid pressure within said cylindrical housing.

6. The low emission disconnect as defined in claim 5, wherein said hydrostat releasably secures said tail piece to said cylindrical housing.

7. The low emission disconnect as defined in claim 6, wherein said tail piece and said housing define a pair of aligned threaded openings, and said hydrostat is threaded within said openings to releasably connect said end piece to said cylindrical housing.

8. A low emission disconnect for positioning along a fluid flow line, the disconnect comprising:
    a valve body having an external male thread portion;
    a ball mounted within the valve body and rotatable about a stem axis between an opened position and a closed position;
    a downstream seal for sealing engagement between the ball and the valve body when the ball is in the closed position;
    a union housing for sealed engagement with the valve body;
    a female body rotatable with respect to the union housing and having an internal female thread thereon for threaded engagement with the male thread on the valve body to bring the union housing into sealed engagement with the valve body;
    a seal for sealing between the valve body and the union housing;
    a poppet member linearly moveable within the union housing from the opened position to the closed position of the ball, the poppet member having an upstream end for positioning within the valve body and a linearly opposing downstream end, the upstream end having an end surface substantially conforming to an exterior surface of the ball when the ball is in the closed position, the end surface on the poppet member having a diameter substantially conforming to the diameter of the downstream seal;
    a poppet seal for sealing between the poppet member and the union housing when the poppet member is in the closed position;
    said union housing having a cylindrical housing and a downstream tail piece threaded onto the downstream end of the cylindrical housing; and
    a hydrostat releasably connecting said tail piece and cylindrical housing to each other in a releasably locked position.

9. The low emission disconnect as defined in claim 8, further comprising: an internally threaded opening in said tail piece and said cylindrical housing alignable with each other, said hydrostat mounted within said internally threaded openings.

10. The low emission disconnect as defined in claim 8, wherein said thermostat comprises a pressure relief device.

11. The low emission disconnect as defined in claim 8, further comprising:
   a stem extending axially from the longitudinal center of the downstream end of the poppet member;
   one or more guide members for said stem spaced axially from said poppet member along the length of said stem for guiding movement of the poppet member relative to the union housing between the opened and the closed positions of the ball; and
   a biasing member for biasing the poppet member to the closed position.

12. The low emission disconnect as defined in claim 11, further comprising:
   an inner sleeve member within said union housing forming a frustoconical inner surface at the downstream end of said sleeve member, a cylindrical inner surface adjacent said frustoconical surface, and an inner shoulder adjacent the upstream end of the inner sleeve member; and
   said poppet member engaging said shoulder in said closed position with said poppet seal sealing against said shoulder.

13. The low emission disconnect as defined in claim 12, wherein said poppet seal comprises an O-ring.

14. The low emission disconnect as defined in claim 8, further comprising:
   a seal on the upstream end of said poppet member for engaging in sealing relation an inner surface on the union housing in the closed position of the valve member.

15. The low emission disconnect as defined in claim 14, wherein said seal comprises an O-ring on the upstream end of said poppet member, and an inner sleeve member within said union housing forms the inner surface of the union housing for receiving the O-ring in sealing relation.

16. The low emission disconnect as defined in claim 15, wherein said inner sleeve member defines a frustoconical inner surface at the downstream end of said sleeve, a cylindrical inner surface adjacent said frustoconical surface, and an annular inner shoulder adjacent the upstream end of inner sleeve member; and
   said O-ring sealing against said shoulder in the closed position.

17. The low emission disconnect as defined in claim 8, wherein said hydrostat is in fluid communication with said cylindrical housing and has a check valve member therein for relieving any excessive fluid pressure within said cylindrical housing.

18. A disconnect for positioning along a fluid flow line, the disconnect comprising:
   a valve body having an external male thread portion;
   a ball mounted within the valve body and rotatable about a stem axis between an opened position and a closed position;
   a downstream seal for sealing engagement between the ball and the valve body when the ball is in the closed position;
   a union housing for sealed engagement with the valve body;
   a female body rotatable with respect to the union housing and having an internal female thread thereon for threaded engagement with the valve body;
   a first compression seal for sealing with the valve body;
   a second compression seal for sealing with the union housing;
   an annular spacer positioned within the valve body and in sealed engagement with both the first compression seal and the second compression seal;
   a poppet member having an upstream arcuate surface for engaging said ball in closed position;
   a stem extending axially from a downstream side of said poppet ember away from said ball for guiding said poppet member between opened nd closed positions;
   an inner sleeve member within said union housing defining an inner surface of said union housing, said poppet member having an outer peripheral surface for engaging said sleeve in a closed position of said ball, said poppet member having a shoulder facing said ball adjacent to said outer peripheral surface; and
   an O-ring mounted on said shoulder for sealing against said sleeve member in a closed position of said ball.

19. A disconnect as defined in claim 18 wherein said inner sleeve member has an inner peripheral surface defining a shoulder facing downstream and positioned in opposed relation to said shoulder on said poppet member in a closed position of said ball with said O-ring sealing between said opposed shoulders in said closed position.

20. The disconnect as defined in claim 18, further comprising:
   a first annular grove and a second annular grove each in the valve body for receiving the first compression seal and the second compression seal, respectively.

* * * * *

UNITED STATES PATENT AND TRADEMARK OFFICE
CERTIFICATE OF CORRECTION

PATENT NO.    : 6,237,633 B1                                    Page 1 of 1
DATED         : May 29, 2001
INVENTOR(S)   : Spencer M. Nimberger It is certified that error appears in the above-identified patent and that said Letters Patent is hereby corrected as shown below:

Column 11,
Line 53, change "influid" to -- in fluid --.

Column 12,
Line 30, change "ember" to -- member --.
Line 31, change "nd" to -- and --.

Signed and Sealed this

Twenty-ninth Day of January, 2002

Attest:

JAMES E. ROGAN
*Attesting Officer*    *Director of the United States Patent and Trademark Office*